(12) United States Patent
Moinard (10) Patent No.: US 7,628,487 B2
(45) Date of Patent: Dec. 8, 2009

(54) METHOD OF CENTERING AN OPHTHALMIC LENS ON A RIMLESS FRAME

(75) Inventor: Bruno Moinard, Charenton (FR)

(73) Assignee: Essilor International, Charenton-le-Pont (FR)

( * ) Notice: Subject to any disclaimer, the term of this patent is extended or adjusted under 35 U.S.C. 154(b) by 238 days.

(21) Appl. No.: 11/886,744

(22) PCT Filed: Mar. 9, 2006

(86) PCT No.: PCT/FR2006/000520

§ 371 (c)(1),
(2), (4) Date: Sep. 20, 2007

(87) PCT Pub. No.: WO2006/106196

PCT Pub. Date: Oct. 12, 2006

(65) Prior Publication Data

US 2009/0066914 A1    Mar. 12, 2009

(30) Foreign Application Priority Data

Apr. 4, 2005 (FR) .................................. 05 03326

(51) Int. Cl.
*G02C 13/00* (2006.01)
(52) U.S. Cl. ...................... 351/178; 351/204; 351/246; 351/177
(58) Field of Classification Search .................. 351/178
See application file for complete search history.

(56) References Cited

U.S. PATENT DOCUMENTS 4,646,445 A * 3/1987 Wehmeier .................... 33/507
4,693,573 A    9/1987 Zoueki et al.
5,617,155 A    4/1997 Ducarouge et al.
6,132,045 A * 10/2000 Gauvreau ................... 351/204
6,607,271 B2    8/2003 Bar et al.
7,530,690 B2 * 5/2009 Divo et al. .................. 351/177

FOREIGN PATENT DOCUMENTS

FR    2 620 927 A    3/1989
FR    2 719 463 A    11/1995
FR    2 807 169 A    10/2001

OTHER PUBLICATIONS

Jalie, "Ophthalmic lenses and dispensing—Part one—Lens centration," Optician, vol. 210, No. 5524, pp. 18-25 (Oct. 1995).

* cited by examiner

*Primary Examiner*—Jessica T Stultz
(74) *Attorney, Agent, or Firm*—Young & Thompson (57) ABSTRACT

A method of centering a target ophthalmic lens presenting a known shape on a target rimless frame, includes identifying the pupillary point on the presentation lens of a presentation frame identical to the target frame, measuring the pupillary height and the pupillary half-distances of the pupillary points, identifying the optical frame of reference of the target lens, transferring the pupillary height and the pupillary half-distances onto the target lens, and deducing the centering position of the target lens. For the presentation lens presenting an outline different from the outline that the target lens will have after edging, the measurements on the presentation lens are taken in a frame of reference associated with the presentation lens, and the position of the target lens is deduced in a frame of reference associated with the target frame.

20 Claims, 5 Drawing Sheets

METHOD OF CENTERING AN OPHTHALMIC LENS ON A RIMLESS FRAME

TECHNICAL FIELD TO WHICH THE INVENTION RELATES

The present invention relates in general manner to the field of eyeglasses and more precisely to mounting the ophthalmic lenses of a pair of correcting eyeglasses on a frame of the rimless type. The invention relates more particularly to a method of centering such a lens.

Said method finds a particularly advantageous application when implemented in software integrated in a machine of the same type as those sold by Essilor International under the trademarks Kappa or Kappa CT.

TECHNOLOGICAL BACKGROUND

The technical portion of the optician's profession consists in mounting a pair of ophthalmic lenses on the frame selected by the wearer. Such mounting comprises two main operations:

- centering each lens, which consists in appropriately positioning the lens in register with the eye of the future wearer, and consequently in register with the frame; and then
- edging each lens, which is an operation consisting in machining or cutting out the outline of the lens to a desired shape, while taking account of the defined centering parameters.

In the context of the present invention, attention is given to the first operation of centering, specifically on the assumption that the frame is of the rimless type. Specifically, the optician needs to define the position that the optical frame of reference of an ophthalmic lens for eyeglasses (typically as obtained from the usual marks or from its optical center) is to occupy on a frame of known shape, so that the lens is suitably positioned in register with the corresponding eye of the wearer in order to perform the optical function for which it has been designed as well as possible.

To do this, the optician initially situates the position of the pupil of each eye on the corresponding lens. This thus determines two main parameters associated with the morphology of the wearer, namely the pupillary distance or the two pupillary half-distances defined as the distances between each of the pupils of the two eyes and the nose of the wearer, and also the heights of the pupils relative to the frame fitted on the wearer's face. When the frame is of the type having rims, the heights may be the so-called "under-pupil" or "datum" heights, defined as being the distance between the pupil of the eye in question and the point of the frame that is situated vertically below the pupil of the eye. In analogous manner, when the frame is of the rimless type, the under-pupil height is defined as being the distance between the pupil of the eye in question and the point on the outline of the lens that is situated vertically below the pupil of the eye. In practice, the optician measures the height as defined in this way on a template-forming pair of presentation lenses constituted by a frame and lenses that are identical in shape to the shape of the lenses that are to be made.

Thereafter, the optician transfers the height as measured in this way to the lens for edging, starting from the position of the centering point of said lens as previously identified and that needs to be positioned relative to the pupil of the wearer. This transferred height together with the corresponding pupillary half-distance then enables the lens to be centered, i.e. to be properly positioned on the frame so as to properly position the desired edging outline on the lens.

More precisely, the centering method presently in use for rimmed and for rimless frames consists in:

i) fitting on the wearer presentation eyeglasses comprising a presentation frame identical to said target frame and at least one presentation lens associated with the same eye as said target lens, and presenting an outline of shape and position relative to the frame that are identical to the shape and position intended for the final outline of the target lens after edging;

ii) pointing out manually, or identifying automatically, on the presentation lens the pupillary point situated in register with the pupil of the corresponding eye of the wearer;

iii) measuring the pupillary height of the pupillary point of the presentation lens;

iv) measuring the pupillary distance or half-distance of the wearer;

v) using deflectometry, interferometry, or image recognition to identify the optical frame of reference of the target lens, and in particular the centering point of the target lens that is to be placed in register with the pupil of the wearer when the wearer is wearing the target eyeglasses;

vi) transferring the pupillary height and the pupillary distance or half-distance onto the target lens from said centering point of the target lens; and vii) deducing therefrom the centering position of the target lens relative to the target frame.

In practice, step iii) is performed by measuring the height difference between the pupillary point of the presentation lens and a presentation reference point associated with the presentation lens. The presentation reference point associated with the presentation lens may be the lowest point of the presentation frame, for example.

Thereafter, in step vi), this height difference is transferred onto the target lens starting from its centering point. Thereafter, in step vii), the centering position of the target lens relative to the target frame, or vice versa, is deduced so that a target remarkable point of the target lens corresponding to the remarkable point of the presentation lens presents the same height difference relative to the centering point as the difference between the remarkable point of the presentation lens and the pupillary point.

It can thus be understood that with that method, it is necessary for the presentation lens to present an outline of shape identical to the shape intended for the final outline of the target lens after edging.

However, it is found that consumers are tending more and more towards treatment that is personalized to a greater extent. With rimless frames, for reasons of fashion or visual comfort, it is then desirable to have great freedom in determining the shape of the lens outline. Unfortunately, the present method of taking pupil height measurements with reference to the bottom edge of a template makes it necessary to have a template of shape identical to the shape that it is desired to obtain finally for the lens. In other words, it is necessary to have as many templates as there are variations in lens shape, which is particularly inconvenient and inflexible, and also restrictive on the freedom that wearers can be given in selecting lens shapes.

OBJECT OF THE INVENTION

An object of the present invention is to propose a method of centering a target ophthalmic lens for eyeglasses having a desired outline of arbitrary shape relative to a frame of the rimless type, on the basis of taking a measurement of the corresponding pupillary height on a template lens of outline having a shape that is different from the shape of the outline of the target lens.

To this end, the invention provides a method of centering a target ophthalmic lens of target eyeglasses on a target frame of the rimless type presenting a final outline of known shape, with a bridge and arms fastened to the target lens at anchor points defined relative to the final outline, the method comprising the steps of:

a) fitting the wearer with presentation eyeglasses comprising a presentation frame identical to said target frame and at least one presentation lens associated with the same eye as said target lens;

b) pointing out manually, or identifying automatically, on the presentation lens the pupillary point with which the pupil of the corresponding eye of the wearer is in register;

c) measuring the pupillary height of the pupillary point of the presentation lens;

d) measuring the pupillary distance or half-distance of the wearer;

e) identifying the optical frame of reference of the target lens and in particular the centering point of the target lens that is to come into register with the pupil of the wearer when the wearer is wearing the target eyeglasses;

f) transferring the pupillary height and the pupillary distance or half-distance onto the target lens from said centering point of the target lens; and g) deducing therefrom the centering position of the target lens relative to the target frame, or vice versa, in which method, for the presentation lens presenting an outline of shape and/or position relative to the presentation frame that differs from the shape and/or position intended for the final outline of the target lens after edging and mounting on the target frame, the following steps are performed:

directly or indirectly measuring in step c), the height of the pupillary point of the presentation lens in a frame of reference based on the presentation frame and independent of the shape of the outline of the presentation lens; and deducing, in step g), the centering position of the target lens relative to the target frame, or vice versa, so that the centering point, in a frame of reference based on the target frame corresponding to the frame of reference of the presentation frame, is situated at the same height as the pupillary point in the frame of reference of the presentation frame.

Thus, the frame of reference relative to which the target lenses are positioned in front of the pupils of the wearer is associated with the eyeglass frames. The frames are identical between the target eyeglasses and the presentation eyeglasses. The optician thus has a frame of reference that is common to both types of eyeglasses. It is therefore no longer necessary for the target lenses and the presentation lenses to present the same outline. The optician therefore does not need to possess, for each type of lens outline on offer, a respective presentation model that is expensive and takes up space.

According to a first advantageous characteristic of the invention, the following steps are performed directly or indirectly: measuring, in step c), the height difference between the pupillary point of the presentation lens and a presentation remarkable point associated with the presentation frame and physically identifiable on said frame; and deducing, in step g), the centering position of the target lens relative to the target frame, or vice versa, so that a target remarkable point associated with the target frame, corresponding to the presentation remarkable point of the presentation frame, presents the same height difference relative to the centering point as the height difference of the presentation remarkable point relative to the pupillary point.

Thus, the presentation remarkable point of the presentation frame is a point that is visually observable and thus easily identifiable. Thus, even without having the geometry of the presentation lenses, i.e. the shape, the dimensions, and the positions of the presentation lenses, the optician can still transfer onto the target lens the height difference measured on the presentation lens between the pupillary point and the presentation remarkable point. This transfer makes it possible firstly to avoid any need for the optician to acquire the shape of the outline of the presentation lenses, and secondly to take the measurement by using any of the presentation eyeglasses available on site and having the frame desired by the client.

By way of example, the presentation remarkable point may be an anchor point for the bridge of the presentation frame on the presentation lens in question or an anchor point for an arm of the presentation frame on the presentation lens in question.

In a first implementation of the invention, in step c), the height difference between the pupillary point of the presentation lens and the presentation remarkable point of the presentation lens is measured directly.

Thus, said pupillary distance is measured easily and quickly without any need for the optician to perform calculation.

In a second implementation of the invention, the following steps are performed:

numerically acquiring the shape of the outline of the presentation lens and the position of said outline relative to the presentation frame, by outline reading and/or feeling and/or image recognition, or on the basis of an electronic file representative of its shape and position relative to the presentation frame;

measuring, in step c), the height difference between the pupillary point of the presentation lens and a presentation reference point of the outline of the presentation lens;

performing calculation, taking account of the known shape of the outline of the presentation lens and of the known position of said outline relative to the presentation frame, to deduce the height of said presentation reference point in the frame of reference associated with the presentation frame; and deducing therefrom the height of the pupillary point of the presentation lens in the frame of reference of the presentation frame.

Thus, opticians can continue with their habit of measuring the height of the pupillary point relative to a reference point on the outline of the presentation lens.

In addition, when the height difference between the pupillary point of the presentation lens and the presentation remarkable point is measured directly, this measurement is performed over a short distance. Unfortunately, the lack of precision in measurements performed over short distances is large, which is why it is desirable to increase the lengths of the measured height differences.

Thus, by using a reference point on the outline of the presentation lens, it is possible to increase the lengths of the differences that are to be measured. The calculated height difference between the pupillary point of the presentation lens and the presentation remarkable point is then made more accurate.

In which case, and advantageously, step c) includes performing calculation, while taking account of the known state of the outline of the presentation lens, to determine the height difference between the presentation reference point and said presentation remarkable point, and deducing therefrom the height difference between the pupillary point of the presentation lens and said presentation remarkable point.

Thus, for reasons of accuracy and simplicity, the optician takes only one measurement in order to determine the height of the pupillary point. This measurement is of long length, thereby increasing its accuracy. The measurement is then compared with the height difference between the reference point and the remarkable point of the presentation lens. This height difference is known accurately insofar as the shape of the presentation lens is known to the optician. The height of the pupillary point is then deduced from a single measurement that presents good accuracy.

Also advantageously, the presentation reference point associated with the presentation lens is the lowest point on the outline of the presentation lens, or else the point on the outline of the presentation lens that is situated vertically below the pupillary point.

Advantageously, the outline of the target lens is selected from a database corresponding to the selected target frame or is selected by an outline deformation technique. Thus, with a database, the future wearer can select frames and then select the outline for the target lenses from a vast range of models. When using the outline deformation technique, the future wearer has the possibility of adapting the outline of the target lenses specifically to the user's own taste.

The invention also provides a device comprising measurement means suitable for identifying the optical frame of reference of the target lens, input or acquisition means for inputting or acquiring the shape of the outline of the target lens, and an electronic and/or computer system designed to perform the transfer and the deduction of steps f) and g) from the frame of reference of the target lens identified in step e) by the measurement means and from the shape of the outline of the target lens acquired with the help of said input or acquisition means. In particular, the electronic and/or computer system is designed to execute calculation of the height of the presentation reference point in the frame of reference associated with the presentation frame, and to deduce from said calculation the height of the pupillary point in the frame of reference associated with the presentation frame.

Thus, the work of the optician is made easier insofar as, in order to implement the centering method, the optician need take measurements only on the presentation lens, with the machine undertaking the operations that are more complex.

DETAILED DESCRIPTION OF AN EMBODIMENT

The following description with reference to the accompanying drawings given as non-limiting examples make it easy to understand what the invention consists in and how it can be performed.

In the accompanying drawings.

In order to implement the invention, it is necessary to have available means that are themselves well known to the person skilled in the art. These means do not themselves form part of the subject matter of the invention described.

Thus, amongst such well-known means, it is possible to use an apparatus for reading outlines as described in patent EP 0 750 172 or as sold by Essilor International under the trademarks Kappa or Kappa CT. It is also possible to use a centering apparatus as described in patent FR 2 825 466 or as sold by Essilor International under the trademarks Kappa or Kappa CT.

A particularly advantageous application of the invention lies in using software integrated in a machine provided with a processor unit and including a program suitable for executing steps f) and g) of the described centering method.

Figure 1:
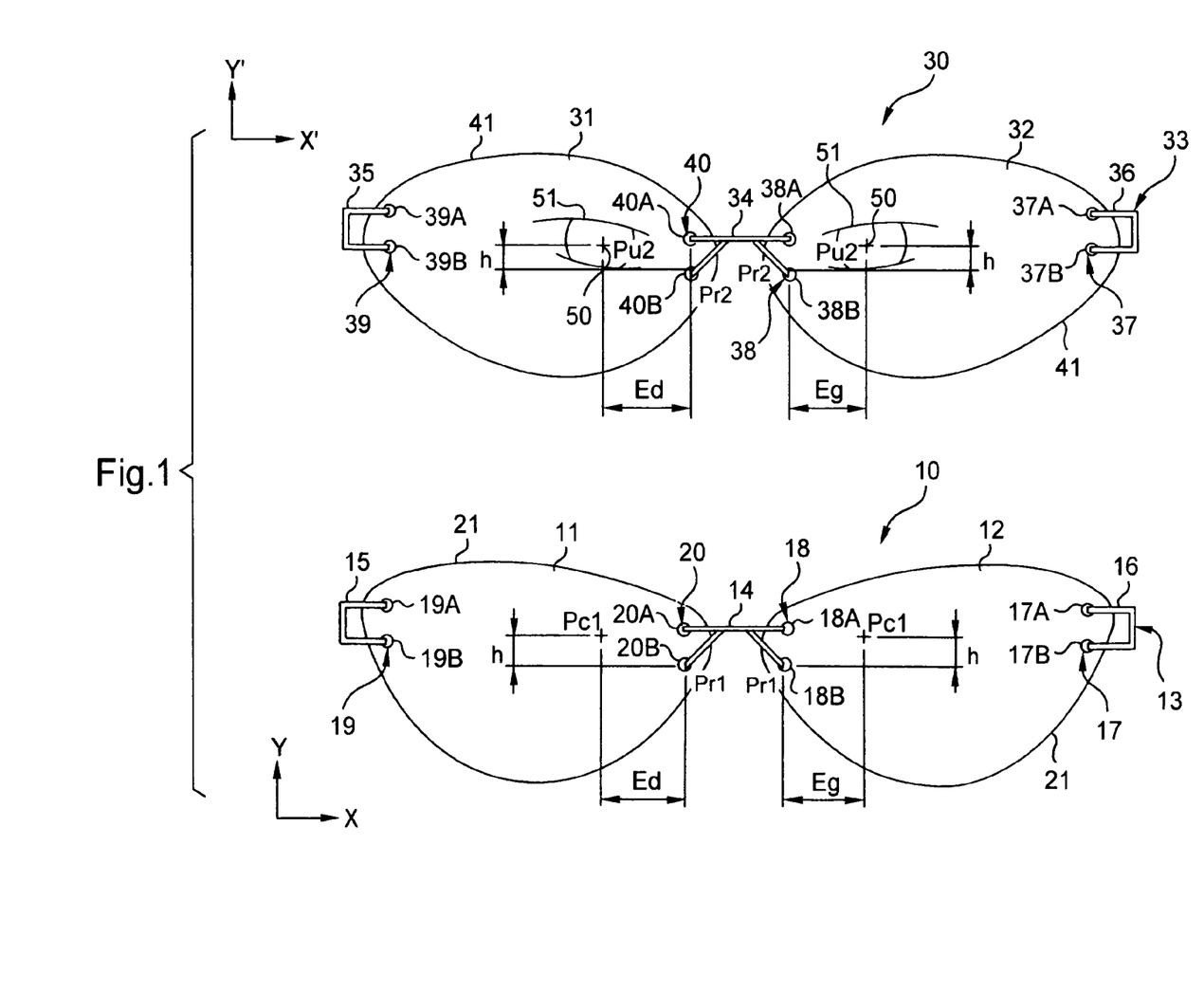
FIG. 1 is a diagrammatic view of the presentation eyeglasses, the target eyeglasses, and the characteristic distances and points of the centering method of the invention.

In practice, the optician has available firstly presentation eyeglasses 30 and secondly two target lenses 11, 12 and a target frame 13.

The presentation eyeglasses 30 are made up of two presentation lenses 31, 32 and a presentation frame 33. Each of the two presentation lenses 31, 32 has four anchor points 37A, 37B, 38A, 38B, 39A, 39B, 40A, 40B. They are also defined by an outline 41. The presentation frame 33 comprises a bridge 34 and two arms 35, 36. The bridge is fastened to four anchor points 38A, 38B, 40A, 40B. The arm 35 is fastened to two anchor points 39A, 39B. The arm 36 is fastened to two other anchor points 37A, 37B.

The object is to take measurements on the presentation eyeglasses 30 that make it possible subsequently to provide a wearer with target eyeglasses 10. For this purpose, the target lenses 11, 12 need to be properly centered in register with the pupils 50 of the wearer when the lenses are mounted on the target frame 13.

The target eyeglasses 10 comprise firstly a target frame 13 and secondly two target lenses 11, 12. The target frame 13 is identical to the presentation frame 33. In contrast, the target lenses 11, 12 present an outline 21 that is different from the outline 41 of the presentation lenses 31, 32. The outline 21 of the target lenses 11, 12 is also known. The two target lenses 11, 12 have four respective anchor points 17A, 17B, 18A, 18B, 19A, 19B, 20A, 20B to which the target frame 13 is fastened.

Since the target frame 13 is identical to the presentation frame 33, it is necessary for the anchor points 17A, 17B, 18A, 18B, 19A, 19B, 20A, 20B of the target lenses 11, 12 to have positions that are identical to the positions of the anchor points 37A, 37B, 38A, 38B, 39A, 39B, 40A, 40B of the presentation lenses 31, 32. Thus, in an X,Y frame of reference based on anchor point 19B, the anchor points 19A, 20A, 20B have coordinates that are identical to the coordinates of the anchor points 39A, 40A, 40B as taken in an X',Y' frame of reference based on anchor point 39B. In addition, in an X,Y frame of reference based on anchor point 18B, the anchor points 18A, 17A, 17B have coordinates that are identical to the coordinates of the anchor points 38A, 37A, 37B taken in a X',Y' frame of reference based on the anchor point 38B.

Prior to centering, the future wearer of the target eyeglasses 10 selects amongst the presentation eyeglasses 30 available to the optician those that include the desired target frame 13.

Thereafter the future wearer selects the outline 21 of the target lenses 11, 12. This choice is made either on the basis of presentation lenses 31, 32 that are available physically, or in a database register, or by deforming the outline of the presentation lenses 31, 32.

If the selection is made from physically available presentation lenses 31, 32, the outline shape is acquired directly from the presentation lenses 31, 32 using an apparatus of the above-mentioned type for reading outlines.

The database serves to match the selected target frame 13 with a variety of outlines 21 for target lenses 11, 12, enabling the target lenses 11, 12 to be mounted on said target frame 13. The database may be computerized or it may be presented in paper form.

Outline deformation is performed using a computerized image processor system. The wearer can thus deform the initial outline as presented so as to adapt it to the wearer's own face. This deformation is done in such a manner that the outline 21 that is presented can be deformed and the target lenses 11, 12 can subsequently be mounted on the target frame 13. The anchor points 37A, 37B, 38A, 38B, 39A, 39B, 40A, 40B conserve their positions relative to the presentation frame 33.

Once the target frame 13 and outline 21 have been selected, the optician can start to take measurements.

In the centering method of the invention, in step a), the optician fits presentation eyeglasses 30 on the wearer, said eyeglasses having the selected presentation frame 33. The presentation lenses 31, 32 of the presentation eyeglasses 30 have an outline 41 that is different from the outline 21 of the target lenses 11, 12. The outline 41 is not necessarily of known shape.

In step b), the optician points out manually on each of the presentation lenses 31, 32 the corresponding pupil point Pu2. The pupil point Pu2 corresponds to the point on the presentation lens 31, 32 that is situated in register with the pupil 50 of the corresponding eye 51 of the wearer.

In a variant, the optician can perform this pointing operation with the help of image acquisition and recognition software that performs electronic and computer identification of the pupil point Pu2 on the basis of a photograph of the face of the wearer wearing the presentation eyeglasses 30.

The optician can then remove the presentation eyeglasses 30 from the wearer so as to measure the height h of the pupil point Pu2 on each of the presentation lenses 31, 32 directly during step c). Said height h corresponds to the distance along the axis Y' between the pupil point Pu2 and a remarkable presentation point Pr2. The remarkable presentation point Pr2 corresponds to the anchor point 38B, 40B of the presentation lens 31, 32. This measurement is performed manually by the optician on each of the presentation lenses 31, 32, e.g. with the help of a rule. In practice, in order to take an accurate measurement, the optician can mark a horizontal line on the presentation lens 31, 32 passing through the anchor point 38B, 40B and can then measure the distance between said line and the pupil point Pu2.

In step d), in accordance with the same method or with the help of a pupillometer or indeed with an image acquisition and processing system, the optician measures the pupillary half-distances Ed, Eg of the wearer on each of the presentation lenses 31, 32.

Conventionally, the pupillary half-distance Ed corresponds to the distance between the middle of the wearer's nose and the pupil 50 of the wearer's right eye 51. Similarly, the pupillary half-distance Eg corresponds to the distance between the middle of the wearer's nose and the pupil 50 of the wearer's left eye 51.

Optionally, as in the example shown in FIG. 1, it is possible for the pupillary half-distance Ed to correspond to the distance along the axis X' between the pupillary point Pu2 of the right presentation lens 31 and the remarkable presentation point Pr2 of the same lens. Similarly, the pupillary half-distance Eg can correspond to the distance along axis X' between the pupillary pint Pu2 of the left presentation lens 32 and the remarkable presentation point Pr2 of the same lens.

Following these measurements, in step e), the optician identifies the optical frame of reference of each target lens 11, 12. In particular, the optician identifies the centering point Pc1 of each target lens 11, 12. This identification is performed using an optical technique that depends on the equipment available to the optician. The technique may be based on deflectometry, interferometry, or image recognition. By way of example, it is possible to use a centering apparatus as described in patent FR 2 825 466. An example of such an apparatus is sold by Essilor International under the trademarks Kappa or Kappa CT.

Said centering point Pc1 corresponds to the point that is to come into register with the pupil 50 of the eye 51 of the wearer when the wearer is wearing the target eyeglasses 10. Thus, in a frame of reference based on the target frame 13 corresponding to the frame of reference of the presentation frame 33, the point Pc1 is situated at the same pupillary height h as the pupillary point Pu2 in the frame of reference of the presentation frame 33. The term "corresponding" is used to mean that both frames of reference have corresponding origin, directions, and normals when the target frame and the presentation frame are superposed.

In step f), and knowing in this way the optical frame of reference of each target lens 11, 12, the optician can easily transfer the pupillary height h and the half-distance Eg, Ed onto each of the target lenses 11, 12 so as to deduce therefrom the position of a remarkable point Pr1. The remarkable point Pr1 corresponds to the anchor point 18B, 20B of the target lens 11, 12.

In step g), now knowing the optical frame of reference of each target lens 11, 12 and also the position of the target remarkable point Pr1, it is easy to deduce the centering position for shaping and drilling the target lens 11, 12. The method of the invention thus ensures that once the target lenses 11, 12 are mounted on the target frame 13, the centering point Pc1 comes into register with the pupil 50 of the wearer.

Figure 2:
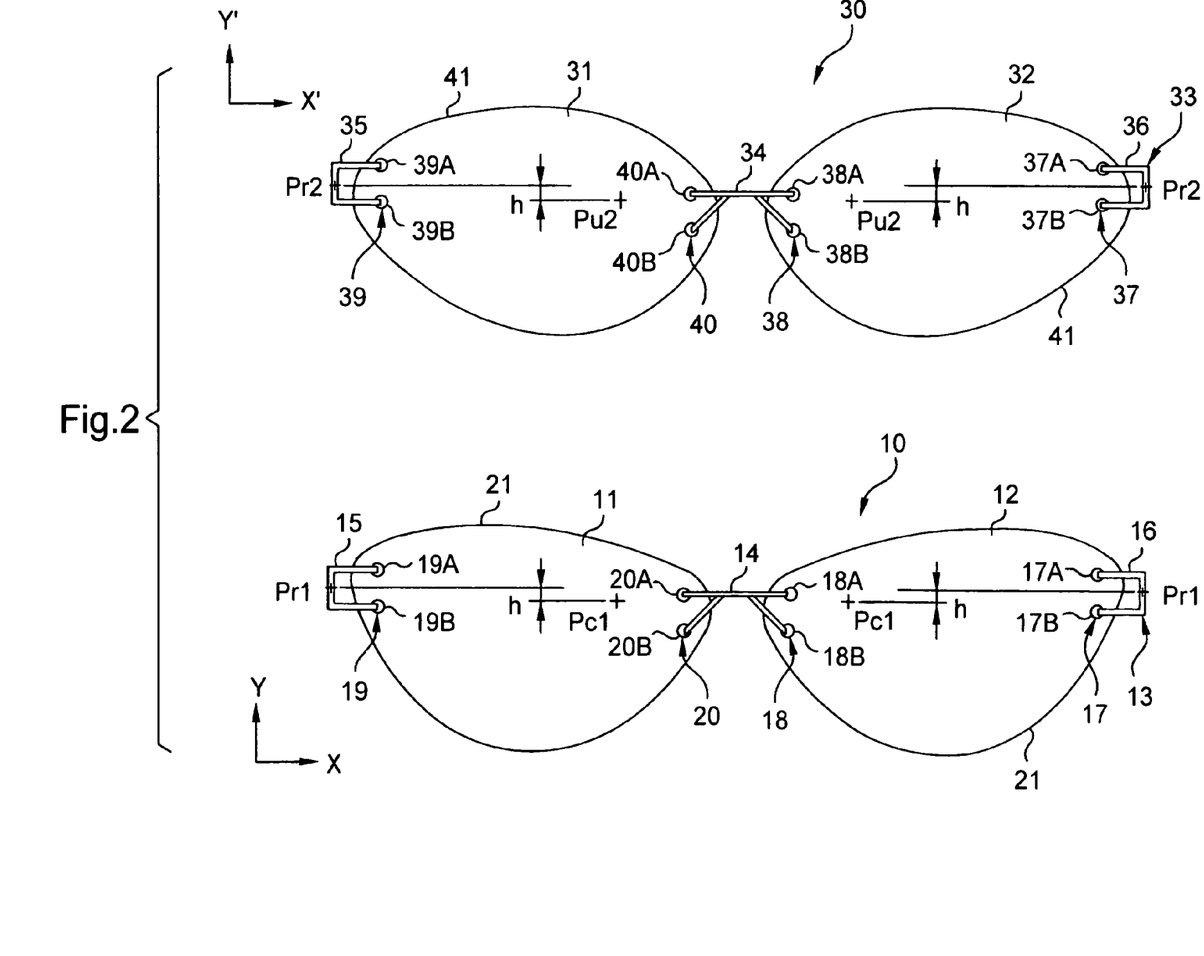
FIG. 2 is a diagrammatic view of the eyeglasses of FIG. 1 showing the characteristic distances and points of a first variant of the centering method.

In a first variant of the centering method, as shown in FIG. 2, the reference point Pr2 is placed directly. In this first variant of the centering method, the presentation and target frames 33 and 13 are still identical. That is why it is possible to place the presentation remarkable point Pr2 on an arbitrary point of the bridge 34 or of the arms 35, 36 in the X',Y' plane.

Thus, the steps consisting firstly in putting the presentation eyeglasses 30 on the wearer, and secondly in pointing out the pupillary points Pu2 on the presentation lenses 31, 32 remain identical. In this example the height h of the pupillary point is measured relative to the height of the new presentation remarkable point Pr2. Following this step, the steps consisting in measuring the pupillary half-distances Eg, Ed and in identifying the optical frame of reference of the target lens 11, 12 remain unchanged. In contrast, transferring the height h onto the target lenses is performed relative to a new reference point Pr1. Since the frames are identical, the target reference point Pr1 in the frame of reference based on the target frame 13 is placed in such a manner as to correspond to the presentation remarkable point Pr2 in the frame of reference of the presentation frame 33. Finally, it is then possible to deduce the centering positions for the target lenses 11, 12.

A particularly advantageous application of the method lies in using software integrated in a machine provided with a processor unit and implementing a program capable of executing as many as possible of the steps of the centering method. It is thus possible to envisage diverse other variant centering methods that are more highly automated in which the outline 41 of the presentation lenses 31, 32 is known.

Figure 3:
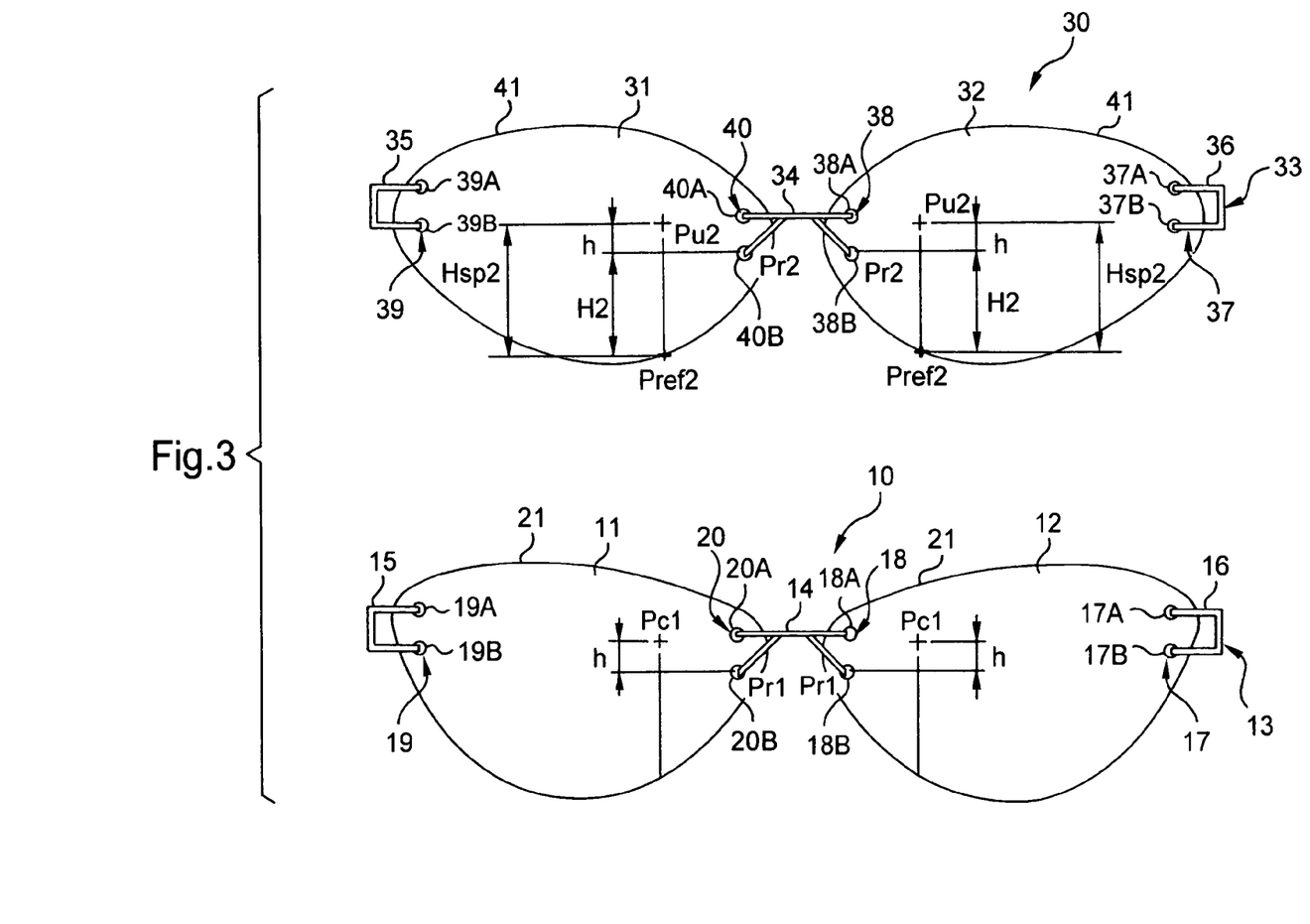
FIG. 3 is a diagrammatic view of the eyeglasses of FIG. 1 showing the characteristic distances and points of a second variant of the centering method.

In a second variant of the centering method, as shown in FIG. 3, the step of measuring the pupillary height h of the pupillary point Pu2 is performed differently.

The steps consisting firstly in fitting the presentation eyeglasses 30 on the wearer and secondly in pointing out the pupillary points Pu2 on the presentation lenses 31, 32 remain identical.

The height h of the pupillary point Pu2 is then measured in three steps. The first step consists in measuring a total height difference Hsp2 ("datum") between the pupillary point Pu2 and a reference point Pref2. The reference point Pref2 corresponds to the point situated on the outline 41 of the presentation lens 31, 32 vertically below the pupillary point Pu2. This measurement is performed manually by the optician, e.g. using a rule. The measured height difference is large relative to the total height of the presentation lenses 31, 32. This reduces the error inherent to measuring short distances.

The second step consists in determining a reference height difference H2 between the reference point Pref2 and the presentation remarkable point Pr2. The presentation remarkable point Pr2 still corresponds to the anchor point 38B, 40B of the presentation lens 31, 32. Since the shape of the position of the outline of the presentation lenses 31, 32 relative to the presentation frame 33 is known, said height difference H2 is also known. The optician obtains this height difference H2 either on receiving the presentation lenses 33, or by using an apparatus for reading outlines as described in patent EP 0 750 172. An example of such an apparatus is sold by Essilor International under the trademarks Kappa or Kappa CT.

The third step consists in deducing the height h of the pupillary point Pu2 of the presentation lens 31, 32 from the results obtained during the first two steps. Said height h corresponds to the difference between said total height difference Hsp2 and said reference height difference H2. This gives a value for h that presents small measurement error.

After this step of determining the height h, the steps consisting in measuring the pupillary half-distances Eg, Ed, in identifying the optical frames of reference of the target lenses 11, 12, in transferring said height h and the pupillary half-distances Eg, Ed to the target lenses 11, 12, and in deducing therefrom the corresponding centering positions remain unchanged.

Figure 4:
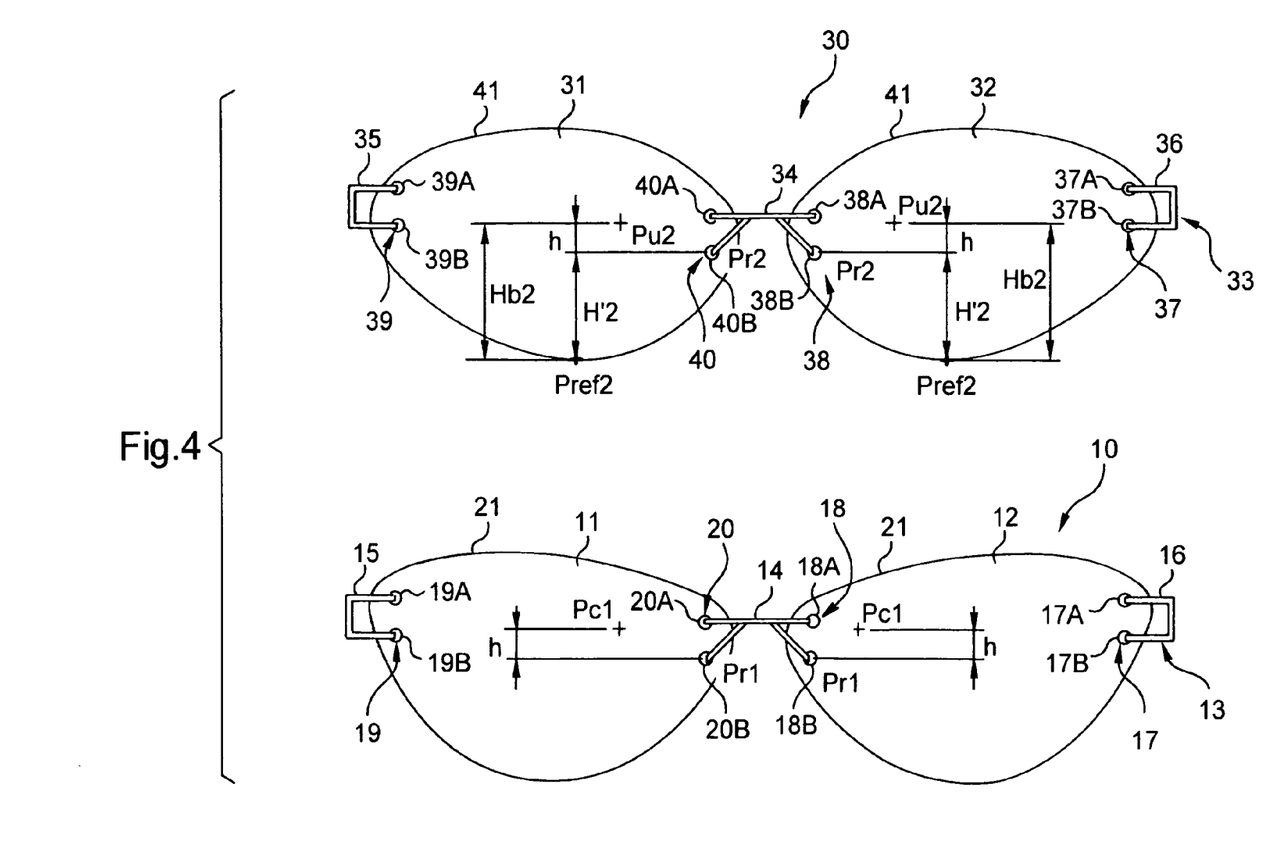
FIG. 4 is a diagrammatic view of the eyeglasses of FIG. 1 showing the characteristic distances and points of a third variant of the centering method.

In a third variant of the centering method as shown in FIG. 4, the step of measuring the pupillary height h of the pupillary point Pu2 is taken in yet another manner. The steps in this variant likewise consist firstly in fitting presentation eyeglasses 30 on the wearer and secondly in pointing out the pupillary points Pu2 on the presentation lenses 31, 32 in identical manner.

The height h of the pupillary point Pu2 is likewise measured in three steps. However compared with the second variant of the method as described above, a different reference point Pref2 is used. The first step consists in measuring a total height difference Hb2 ("boxing" height) between the pupillary point Pu2 and a new reference point Pref2. The new reference point Pref2 corresponds to the point situated at the lowest position on the outline 41 of the presentation lens 31, 32. The second step consists in determining a reference height difference H'2 between the new reference point Pref2 and the presentation remarkable point Pr2, and this is done by calculation. The shape and the position of the outline 41 of the presentation lenses relative to the presentation frames 33 are also known in this example. The third step consists in deducing therefrom the height h of the pupillary point Pu2 of the presentation lens 31, 32 using a technique that is identical to that used in the second variant of the method.

Following this step of measuring the height h, the steps that consist in measuring the pupillary half-distances Eg, Ed, in identifying the optical frames of reference of the target lenses 11, 12, in transferring said height h and the pupillary half-distances Eg, Ed onto the target lenses 11, 12, and in deducing the centering positions therefrom remain likewise unchanged.

Figure 5:
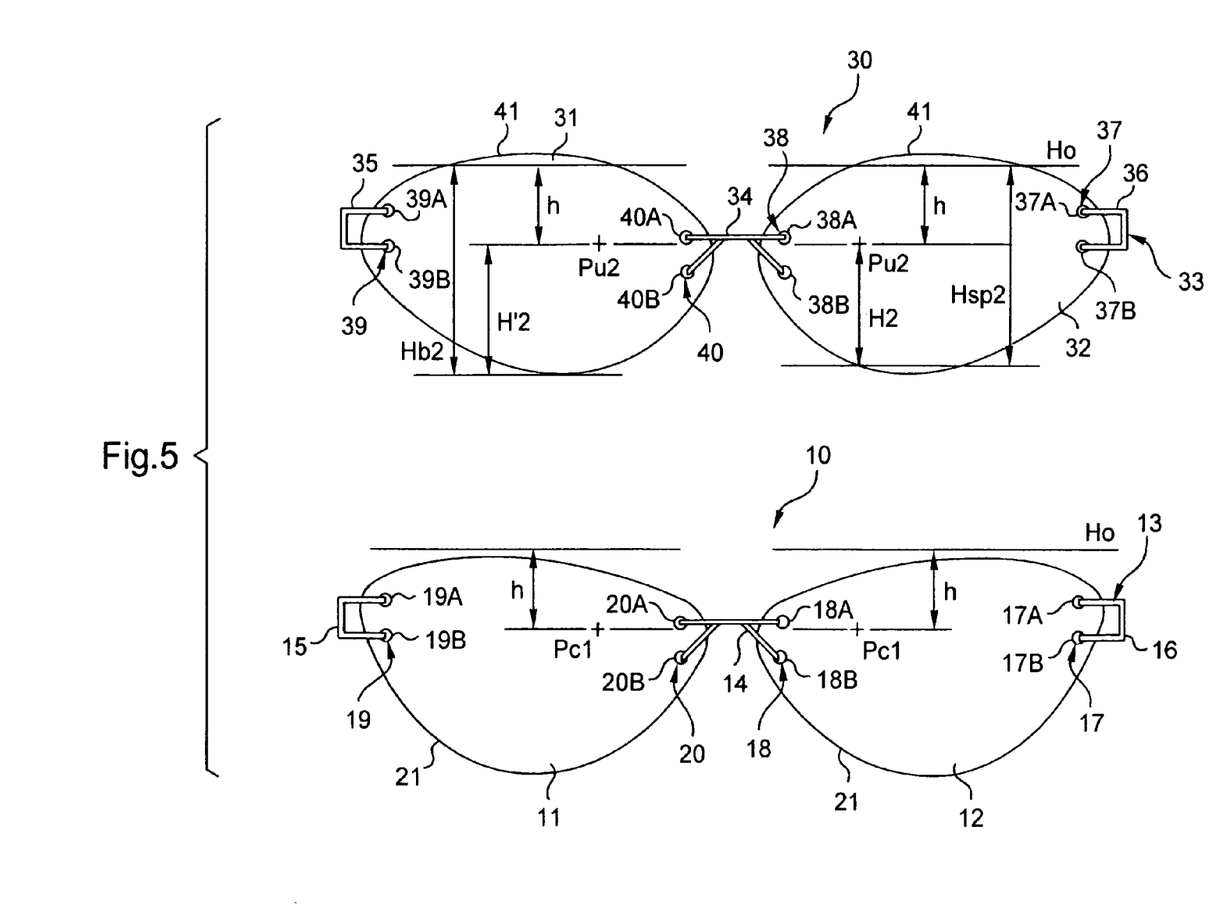
FIG. 5 is a diagrammatic view of the eyeglasses of FIG. 1 showing the characteristic distances and points of a fourth variant of the centering method.

In a fourth variant of the centering method, as shown in FIG. 5, measurements are no longer taken relative to a reference point but relative to a reference height H0 in the frame of reference of the presentation frame.

In this example again, the steps that consist firstly in fitting the presentation eyeglasses 30 on the wearer and secondly in pointing out the pupillary points Pu2 on the presentation lenses 31, 32 remain identical.

The height h of the pupillary point Pu2 continues to be performed in three steps as in either of the second and third variant methods of the invention. This variant differs insofar as reference is no longer made to a presentation remarkable point Pr2.

The first step still consists in measuring a height difference H'2 or H2 depending on the selected technique, between the pupillary point Pu2 and the reference point Pref2. The second step differs from the above variant methods insofar as the height difference Hb2 or Hsp2 corresponds to the height difference between the selected reference point Pref2 and a height H0. If the optician so desires, this height H0 may depend physically on the presentation frame 33, but that is not necessarily always true. In contrast, this height H0 has coordinates that are known in a frame of reference based on the presentation frame 33. Thus, knowing the shape and the position of the outline of the presentation lenses 31, 32 relative to the presentation frame, it is possible to determine the value for the height difference Hb2 or Hsp2. The third step consisting in determining the height h is performed using the same method as before.

After these steps, the steps consisting in measuring the pupillary half-distances Eg, Ed, in identifying the optical frames of reference of the target lenses 11, 12, in transferring said heights h and the pupillary half-distances Eg, Ed to the target lenses 11, 12, and in deducing their centering positions therefrom remain unchanged. The target lenses 11, 12 are centered in such a manner that the pupillary half-distances Ed, Eg measured on the presentation lenses 31, 32 are transferred correctly onto the target lenses 11, 12 and in such a manner that the height H0 positioned relative to the presentation frame 33 presents a height difference h relative to the centering point Pc1 of the target lenses 11, 12.

The invention claimed is:

1. A method of centering a target ophthalmic lens (11, 12) of target eyeglasses (10) on a target frame (13) of the rimless type presenting a final outline (21) of known shape, with a bridge (14) and arms (15, 16) fastened to the target lens at anchor points (17, 18, 19, 20) defined relative to the final outline (21), the method comprising the steps of:

a) fitting the wearer with presentation eyeglasses (30) comprising a presentation frame (33) identical to said target frame (13) and at least one presentation lens (31, 32) associated with the same eye as said target lens;

b) pointing out manually, or identifying automatically, on the presentation lens (31, 32) the pupillary point (Pu2) with which the pupil (50) of the corresponding eye (51) of the wearer is in register;

c) measuring the pupillary height of the pupillary point (Pu2) of the presentation lens (31, 32);

d) measuring the pupillary distance or half-distance (Eg, Ed) of the wearer;

e) identifying the optical frame of reference of the target lens (11, 12) and in particular the centering point (Pc1) of the target lens (11, 12) that is to come into register with the pupil (50) of the wearer when the wearer is wearing the target eyeglasses (10);

f) transferring the pupillary height and the pupillary distance or half-distance onto the target lens (11, 12) from said centering point (Pc1) of the target lens (11, 12); and g) deducing therefrom the centering position of the target lens (11, 12) relative to the target frame (13), or vice versa;

characterized in that, for the presentation lens (31, 32) presenting an outline (41) of shape and/or position relative to the presentation frame differing from the shape and/or position intended for the final outline (21) of the target lens (11, 12) after edging and mounting on the target frame, the following steps are performed:

directly or indirectly measuring in step c), the height (h) of the pupillary point (Pu2) of the presentation lens (31, 32) in a frame of reference based on the presentation frame (33) and independent of the shape of the outline (41) of the presentation lens (31, 32); and deducing, in step g), the centering position of the target lens (11, 12) relative to the target frame (13), or vice versa, so that the centering point (Pc1), in a frame of reference based on the target frame (13) corresponding to the frame of reference of the presentation frame (33), is situated at the same height (h) as the pupillary point (Pu2) in the frame of reference of the presentation frame (33).

2. A method according to claim 1, comprising the steps of:
directly or indirectly measuring, in step c), the height difference (h) between the pupillary point (Pu2) of the presentation lens (31, 32) and a presentation remarkable point (Pr2) associated with the presentation frame (33) and physically identifiable on said frame; and deducing, in step g), the centering position of the target lens (11, 12) relative to the target frame (13), or vice versa, so that a target remarkable point (Pr1) associated with the target frame (13), corresponding to the presentation remarkable point (Pr2) of the presentation frame, presents the same height difference (h) relative to the centering point (Pc1) as the height difference of the presentation remarkable point (Pr2) relative to the pupillary point (Pu2).

3. A method according to claim 2, in which the presentation remarkable point (Pr2) of the presentation frame (33) is an anchor point of said frame on the presentation lens (31, 32).

4. A method according to claim 3, in which the presentation remarkable point (Pr2) is an anchor point of the bridge (34) of the presentation frame (33) on the presentation lens (31, 32) concerned.

5. A method according to claim 3, in which the presentation remarkable point (Pr2) is an anchor point for an arm (35, 36) of the presentation frame (33) on the presentation lens (31, 32) concerned.

6. A method according to claim 2, in which, in step c), the height difference (h) between the pupillary point (Pu2) of the presentation lens (31, 32) and the presentation remarkable point (Pr2) of the presentation lens (33) is measured directly.

7. A method according to claim 2, including the following steps:

numerically acquiring the shape of the outline of the presentation lens (31, 32) and the position of said outline relative to the presentation frame, by outline reading and/or feeling and/or image recognition, or on the basis of an electronic file representative of its shape and position relative to the presentation frame;

measuring, in step c), the height difference (Hb2; Hsp2) between the pupillary point (Pu2) of the presentation lens (31, 32) and a presentation reference point (Pref2) of the outline (41) of the presentation lens (31, 32);

performing calculation, taking account of the known shape of the outline (41) of the presentation lens (31, 32) and of the known position of said outline (41) relative to the presentation frame (33), to deduce the height (H2; H'2) of said presentation reference point (Pref2) in the frame of reference associated with the presentation frame (33); and deducing therefrom the height (h) of the pupillary point (Pu2) of the presentation lens (31, 32) in the frame of reference of the presentation frame (33).

8. A method according to claim 7, including, in step c), performing calculation, taking account of the known state of the outline of the presentation lens (31, 32) to determine the height difference between the presentation reference point (Pref2) and said presentation remarkable point (Pr2), and deducing therefrom the height difference (h) between the pupillary point (Pu2) of the presentation lens (31, 32) and said presentation remarkable point (Pr2).

9. A method according to claim 7, in which the presentation reference point (Pref2) associated with the presentation lens (31, 32) is the lowest point of the outline (41) of the presentation lens (31, 32).

10. A method according to claim 7, in which the presentation reference point (Pref2) associated with the presentation lens (31, 32) is the point of the outline of the presentation lens (31, 32) that is situated vertically below the pupillary point (Pu2).

11. A method according to claim 1, in which the final outline (21) of the target lens (11, 21) is selected from a database corresponding to the selected target frame (13).

12. A method according to claim 1, in which the final outline (21) of the target lens (11, 12) is selected by deforming the outline (41) of the presentation lenses (31, 32).

13. A device for implementing the method according to claim 7, the device comprising measurement means suitable for identifying the optical frame of reference of the target lens (11, 12), input or acquisition means for inputting or acquiring the shape of the outline (21) of the target lens (11, 12), and an electronic and/or computer system designed to perform the transfer and the deduction of steps f) and g) from the frame of reference of the target lens (11, 12) identified in step e) by the measurement means and from the shape of the outline (21) of the target lens (11, 12) acquired with the help of said input or acquisition means.

14. A device according to claim 13, in which the electronic and/or computer system is designed to execute calculation of the height (H2; H'2) of the presentation reference point (Pref2) in the frame of reference associated with the presentation frame (33), and to deduce from said calculation the height (h) of the pupillary point (Pu2) in the frame of reference associated with the presentation frame (33).

15. A device for implementing the method according to claim 1, the device comprising measurement means suitable for identifying the optical frame of reference of the target lens (11, 12), input or acquisition means for inputting or acquiring the shape of the outline (21) of the target lens (11, 12), and an electronic and/or computer system designed to perform the transfer and the deduction of steps f) and g) from the frame of reference of the target lens (11, 12) identified in step e) by the measurement means and from the shape of the outline (21) of the target lens (11, 12) acquired with the help of said input or acquisition means.

16. A method according to claim 1, including the following steps:
- numerically acquiring the shape of the outline of the presentation lens (31, 32) and the position of said outline relative to the presentation frame, by outline reading and/or feeling and/or image recognition, or on the basis of an electronic file representative of its shape and position relative to the presentation frame;
- measuring, in step c), the height difference (Hb2; Hsp2) between the pupillary point (Pu2) of the presentation lens (31, 32) and a presentation reference point (Pref2) of the outline (41) of the presentation lens (31, 32);
- performing calculation, taking account of the known shape of the outline (41) of the presentation lens (31, 32) and of the known position of said outline (41) relative to the presentation frame (33), to deduce the height (H2; H'2) of said presentation reference point (Pref2) in the frame of reference associated with the presentation frame (33); and deducing therefrom the height (h) of the pupillary point (Pu2) of the presentation lens (31, 32) in the frame of reference of the presentation frame (33).

17. A method according to claim 8, in which the presentation reference point (Pref2) associated with the presentation lens (31, 32) is the lowest point of the outline (41) of the presentation lens (31, 32).

18. A method according to claim 8, in which the presentation reference point (Pref2) associated with the presentation lens (31, 32) is the point of the outline of the presentation lens (31, 32) that is situated vertically below the pupillary point (Pu2).

19. A method according to claim 16, in which the presentation reference point (Pref2) associated with the presentation lens (31, 32) is the lowest point of the outline (41) of the presentation lens (31, 32).

20. A method according to claim 16, in which the presentation reference point (Pref2) associated with the presentation lens (31, 32) is the point of the outline of the presentation lens (31, 32) that is situated vertically below the pupillary point (Pu2).

* * * * *

UNITED STATES PATENT AND TRADEMARK OFFICE
CERTIFICATE OF CORRECTION

| | | |
|---|---|---|
| PATENT NO. | : 7,628,487 B2 | Page 1 of 1 |
| APPLICATION NO. | : 11/886744 | |
| DATED | : December 8, 2009 | |
| INVENTOR(S) | : Bruno Moinard | |

It is certified that error appears in the above-identified patent and that said Letters Patent is hereby corrected as shown below:

On the title page, item (73) should read as follows:

--(73) Assignee: Essilor International (Compagnie Generale d'Optique), Charenton-le-Pont (FR)--.

Signed and Sealed this

First Day of June, 2010

David J. Kappos
*Director of the United States Patent and Trademark Office*